(12) United States Patent
Walker

(10) Patent No.: US 9,100,770 B2
(45) Date of Patent: *Aug. 4, 2015

(54) METHOD AND APPARATUS FOR BLACKOUT, RETUNE AND SUBSCRIPTION ENFORCEMENT IN A CELLULAR NETWORK MULTIMEDIA DISTRIBUTION SYSTEM

(71) Applicant: QUALCOMM Incorporated, San Diego, CA (US)

(72) Inventor: Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,202

(22) Filed: Dec. 15, 2014

(65) Prior Publication Data

US 2015/0099504 A1 Apr. 9, 2015

Related U.S. Application Data

(63) Continuation of application No. 11/116,891, filed on Apr. 27, 2005, now Pat. No. 8,942,728.

(60) Provisional application No. 60/568,053, filed on May 3, 2004, provisional application No. 60/664,453, filed on Mar. 22, 2005.

(51) Int. Cl.
*H04W 24/00* (2009.01)
*H04W 4/00* (2009.01)
*H04W 8/24* (2009.01)

(52) U.S. Cl.
CPC ............. *H04W 4/001* (2013.01); *H04W 8/24* (2013.01)

(58) Field of Classification Search
CPC ...... H04W 8/245; H04W 88/02; H04W 64/00
USPC ............... 455/403, 418, 422.1, 432.1, 456.1, 455/456.3
See application file for complete search history.

(56) References Cited

U.S. PATENT DOCUMENTS 5,754,946 A 5/1998 Cameron et al.
5,960,345 A * 9/1999 Laatu ..................... 455/435.1

(Continued)

FOREIGN PATENT DOCUMENTS

CL 171998 11/1998
JP 1065632 A2 3/1989

(Continued)

OTHER PUBLICATIONS

International Search Report—PCT/US05/015287, International Search Authority—European Patent Office, Aug. 11, 2005.

(Continued)

*Primary Examiner* — Patrick Edouard
*Assistant Examiner* — Matthew Genack
(74) *Attorney, Agent, or Firm* — Arent Fox LLP

(57) ABSTRACT

A method for blackout, retune and roaming enforcement in a cellular network multimedia distribution system. The method includes the steps of receiving a plurality of service regions in the cellular network multimedia distribution system; determining an affiliation of the client with one of the service regions in the plurality of service regions; and, processing a service region specific message based on the affiliation. An apparatus, as well as a computer readable medium having instructions stored thereon, the stored instructions, when executed by a processor, cause the processor to perform the method are also disclosed.

8 Claims, 4 Drawing Sheets

(56) References Cited

U.S. PATENT DOCUMENTS

| | | | |
|---|---|---|---|
| 6,009,096 A | 12/1999 | Jaisingh et al. | |
| 6,725,022 B1 | 4/2004 | Clayton et al. | |
| 7,130,282 B2 | 10/2006 | Black | |
| 7,366,462 B2 | 4/2008 | Murali et al. | |
| 7,370,343 B1* | 5/2008 | Ellis | 725/58 |
| 7,773,702 B2 | 8/2010 | Xiong | |
| 2001/0052077 A1 | 12/2001 | Fung et al. | |
| 2002/0062730 A1* | 5/2002 | Thornton | 86/50 |
| 2002/0157002 A1 | 10/2002 | Messerges et al. | |
| 2003/0022624 A1 | 1/2003 | Sato | |
| 2003/0126594 A1* | 7/2003 | Tsuria et al. | 725/25 |
| 2004/0057449 A1 | 3/2004 | Black | |
| 2004/0120283 A1* | 6/2004 | Rezaiifar et al. | 370/328 |
| 2004/0193902 A1* | 9/2004 | Vogler et al. | 713/193 |
| 2004/0246915 A1* | 12/2004 | Watanabe | 370/313 |
| 2005/0266833 A1 | 12/2005 | Walker | |

FOREIGN PATENT DOCUMENTS

| | | | |
|---|---|---|---|
| JP | H06224823 A | 8/1994 | |
| JP | 8256372 | 10/1996 | |
| JP | 11504486 | 4/1999 | |
| JP | 2001148743 A | 5/2001 | |
| JP | 2001244874 | 9/2001 | |
| JP | 2002262351 A | 9/2002 | |
| JP | 2002305765 A | 10/2002 | |
| JP | 2003522425 | 7/2003 | |
| JP | 2003526971 | 9/2003 | |
| JP | 2004005339 | 1/2004 | |
| JP | 2004133730 A | 4/2004 | |
| WO | 9635293 A1 | 11/1996 | |
| WO | 9741654 A1 | 11/1997 | |
| WO | 9907147 A1 | 2/1999 | |
| WO | 0044119 A1 | 7/2000 | |
| WO | 0122633 A1 | 3/2001 | |
| WO | 0122712 | 3/2001 | |
| WO | 2004028112 | 4/2004 | |
| WO | 2004028113 | 4/2004 | |
| WO | 2005043310 A2 | 5/2005 | |
| WO | 2005109632 | 11/2005 | |

OTHER PUBLICATIONS

Taiwan Search Report—TW094114327—TIPO—Aug. 9, 2011.
Written Opinion—PCT/US05/015287, International Search Authority—European Patent Office, Aug. 11, 2005.

* cited by examiner

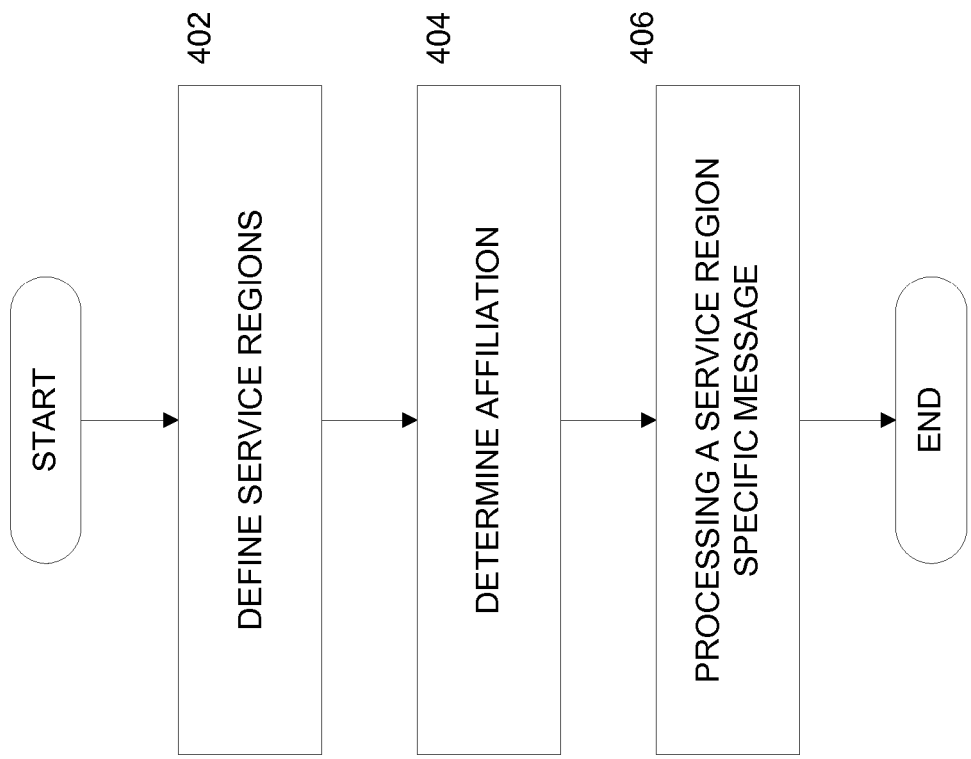

METHOD AND APPARATUS FOR BLACKOUT, RETUNE AND SUBSCRIPTION ENFORCEMENT IN A CELLULAR NETWORK MULTIMEDIA DISTRIBUTION SYSTEM

CROSS-REFERENCE TO RELATED APPLICATION(S)

This application is a continuation of U.S. application Ser. No. 11/116,891, entitled "Method and Apparatus for Blackout, Retune and Subscription Enforcement in a Cellular Network Multimedia Distribution System," filed Apr. 27, 2005, which claims the benefit of U.S. Provisional Application No. 60/568,053, filed May 3, 2004, and U.S. Provisional Application No. 60/664,453, filed Mar. 22, 2005 and are assigned to the assignee hereof and are hereby expressly incorporated by reference herein.

BACKGROUND

1. Field

The present invention relates generally to determining an affiliation of a client to a media distribution system, and more particularly, to a method and apparatus in a media broadcast system for supporting enforcement of blackout, retune and enforcement of roaming fees for a client in the system.

2. Background

As 3G and other cellular networks are deployed, new IP packet data based services are emerging. One of the most challenging service areas operators are seeking to exploit involves the distribution of video content to the mass market. High-quality video is the most data-intensive type of content. At the same time, consumer experience with current home viewing options presents operators and content providers with target markets that hold established ideas about what the user experience should be. The combination of consumer expectations and mobility present fundamental challenges to network operators and content providers. In summary, attractive business models, network control and management, access control, device capabilities and a compelling user experience combine to present a complex of interdependent challenges that have not been fully resolved in the wireless industry.

Currently, national cable programmers such as ESPN, which offers live event programming, are often subject to contracts that define blackout areas that are usually associated with the home market(s) of the team(s). In these geographical areas, the rights to the games may have been sold to a regional network, ad hoc network, or a pay per view service. In order to support these contractual obligations the cable programmer offers alternate programming during the blackout. The satellite receiver at the cable head end makes the replacement programming available. The programmer uses an in-band protocol from the cable programmer's head end to controls the retune process.

Blackout refers to the exclusion of national programming for the geographical area that is excluded from an otherwise national programming distribution of a specific service. A feed refers to a specific multiplex of channels. Under this definition the wide area operation infrastructure (WOI) may create multiple "feeds" that support specific geographic areas. A retune feed contains alternate programming for a blacked out region. A national media broadcast service is predicated on the availability of wide area services such as CNN and or ESPN that are distributed over large portions of the country in a single format. This allows overlapping signal coverage of adjacent service areas to add constructively. A necessary condition for this feature to function properly is that the "national" programming is bit and symbol exact at the physical layer as transmitted from all adjacent service areas. This, in turn, requires the decrypted programming keys and key streams to be identical.

However, the presence of a retune event causes a service to no longer match the wide area feed. This changes the character of the retuned service to be more similar to a local feed. Local feeds, by definition, are different in adjacent local area operation infrastructure (LOI) service areas, and interfere with the local programming from other LOI service areas. These "local services" will likely have independent program keys, and key streams.

An apparatus and method for an LOI is the collection of equipment and software that is required to support a single designated market area. The location control of the satellite retune system can be quite fine (e.g., one ZIP code). A media broadcast system is expected to operate on a LOI by LOI basis. This may be acceptable to cable programmers, since LOI(s) are nominally per market.

Affiliation is when a client is within or mostly within the coverage area of an individual LOI that is affiliated with that LOI. A "home" LOI is where each client has a single LOI defined as its base LOI. It is nominally linked to physical location of the area code and or billing address of client.

Ad replacement, blackout and retune (substitution) programming, and subscription are all position sensitive service features. If a client is in the service area for which one of these mechanisms applies, it should be impacted. For example, if the client is outside its home LOI, service may be shut off, or additional subscription required. However, the determination of when the client is "outside" of its home LOI is a non-trivial matter.

What is desirable is a methods and apparatus system for supporting enforcement of blackout, retune and enforcement of subscription restrictions for a client in a media broadcast system.

SUMMARY

The disclosed embodiments provide methods and apparatus system for supporting enforcement of blackout, retune and subscriptions for a client in a media broadcast system.

In one embodiment, a method for blackout, retune and subscription enforcement in a cellular network multimedia distribution system is disclosed. The method includes the acts of defining a plurality of service regions in the cellular network multimedia distribution system; determining at least one affiliation of the client with one of the service regions in the plurality of service regions; and, processing at least one service region specific message based on the at least one affiliation.

In another embodiment, a computer-readable medium having instructions stored thereon, the stored instructions, when executed by a processor, cause the processor to perform a method for blackout, retune and subscription enforcement in a cellular network multimedia distribution system is disclosed. The method includes the acts of defining a plurality of service regions in the cellular network multimedia distribution system; determining at least one affiliation of the client with one of the service regions in the plurality of service regions; and, processing at least one service region specific message based on the at least one affiliation.

In yet another embodiment, an apparatus for blackout, retune and subscription enforcement in a cellular network multimedia distribution system is disclosed. The apparatus includes means for defining a plurality of service regions in the cellular network multimedia distribution system; means for determining at least one affiliation of the client with one of the service regions in the plurality of service regions; and means for processing at least one service region specific message based on the at least one affiliation.

Other objects, features and advantages of the disclosed embodiments will become apparent to those skilled in the art from the following detailed description. It is to be understood, however, that the detailed description and specific examples, while indicating preferred embodiments of the present invention, are given by way of illustration and not limitation.

BRIEF DESCRIPTION OF THE DRAWINGS

The invention may be more readily understood by referring to the accompanying drawings in which:

FIG. 4 is a flow diagram of the method of affiliation in accordance with one embodiment.

Like numerals refer to like parts throughout the several views of the drawings.

DETAILED DESCRIPTION

The disclosed embodiments provide for the enforcement of blackout, retune and area specific subscription for a client affiliated with a particular local area operation infrastructure (LOI) or wide area operational infrastructure (WOI). In one embodiment, the enforcement is based on a client being affiliated with a services region (e.g., LOI or WOI), where the service regions are defined by a global positioning system (GPS). In another embodiment, the enforcement is based on a client being affiliated with a service region based on contact with the service region. In yet another embodiment, the enforcement is based on the client being affiliated with a service region based on a wireless network.

Figure 1:
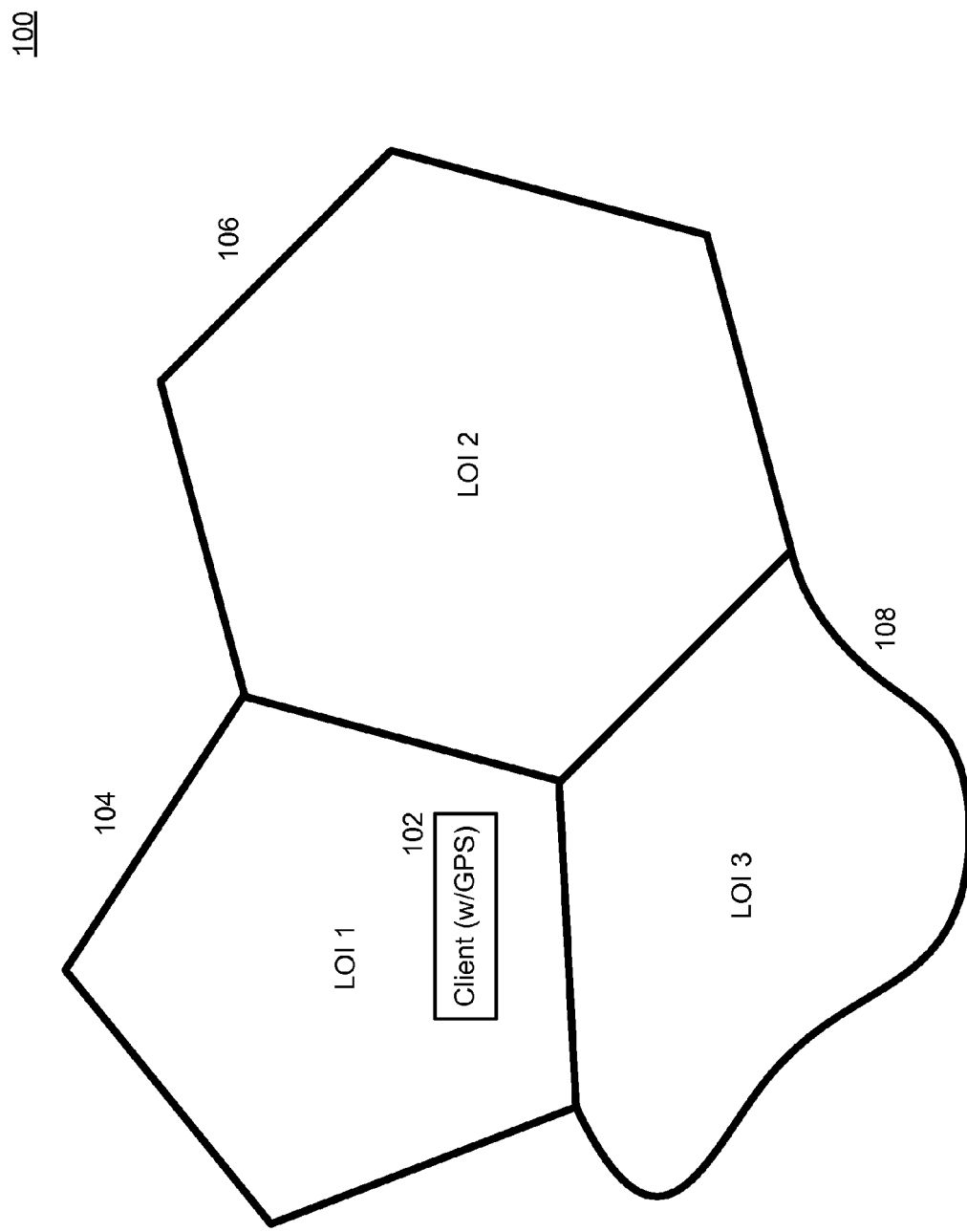
FIG. 1 is a diagram of a client affiliation with a service region, configured in accordance with one embodiment, based on a global positioning system.

FIG. 1 illustrates a GPS client affiliation system 100 having a plurality of GPS defined service regions, including a LOI 104, a LOI 106 and a LOI 108 where a client 102 receives the geographic coordinates for a closed geometric shape or shapes from each LOI that define the service area of the LOI. In one embodiment, if client 102 is within the currently defined shape it is subject to blackout, retune and restrictions for that area. If client 102 is outside the defined shape for a specific LOI, the blackout and retunes restrictions are not enforced. In another embodiment, if client 102 is outside the defined shape of the LOI, then regional subscription charges apply. Use of the GPS-based system provides accurate control over the physical coverage area. As shown in FIG. 1, LOI 104 and LOI 106 are polygons, with LOI 104 being a pentagon and LOI 106 being a hexagon. In another embodiment, the service regions may be other polygons, or other geometric shapes such as circles or ovals. In yet another embodiment, the service regions may be non-geometric shapes, such as LOI 108. The database of geographic coordinates stored on client 102 may be updated periodically or from time-to-time to reflect changes in the shapes of the LOI. It should be noted that, in each of the cases described herein, the areas covered by the LOI's do not have to be contiguous nor do they need to overlap.

However, GPS reception may not be assured for all coverage areas. GPS signals, for example, cannot be reliably received inside of an automobile without an external antenna. In one embodiment, if client 102 depends on GPS for position to enforce contracts, client 102 may shut down when it is not receiving GPS signals. In another embodiment, client 102 will switch to another mode of affiliation when it is not receiving GPS signals.

Although defining and communicating the coordinates of each LOI's service area to the client adds some complexity to system 100, there is a potential to have support for multiple service areas within a single LOI depending on contract rights. Thus, when customers know that GPS capability exists within the system, they may demand that support is based completely on location, and dissociated with a particular LOI. For example, the possibility of multiple concurrent blackouts within a single LOI could result in a customer asking the system to support a particular shape per blackout, rather than a shape per LOI.

It should be noted that the presence of GPS might not assure that client 102 is receiving the messages that it requires for proper functioning. If client 102 does not receive a retune message to receive the retune program from system 100, for example, it will not execute the function. In one embodiment, client 102 may store blackout and retune messages and execute the appropriate functions based on the detected location and a timestamp. In addition, client 102 may store and report its detected location and operate independently of receiving messages from system 100. For example, client 102 may detect that it is roaming when it is outside of its home LOI, based on its knowledge of the shapes of the service areas, and report its usage during this time when it is able to communicate with system 100. Thus, client 102 may act autonomously without being able to continuously send and receive messages, once it receives the shapes of the services areas, if client 102 is able to receive GPS reception.

Figure 2:
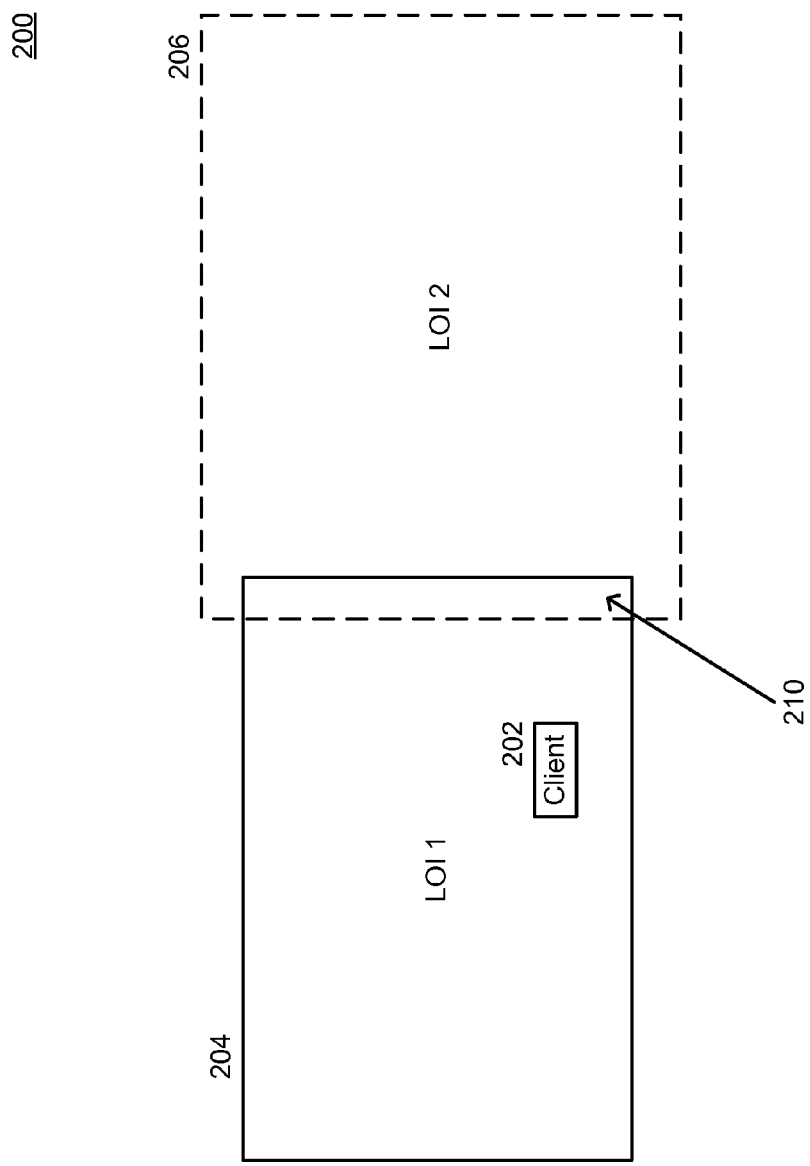
FIG. 2 is a diagram of a client affiliation with a service region, configured in accordance with another embodiment, based on a contact with a local area operation infrastructure (LOI); and, FIG. 3 is a diagram of a client affiliation with a service region, configured in accordance with yet another embodiment, based on a wireless network.

FIG. 2 illustrates a system 200 where the service regions include a LOI 204 and LOI 206, and the affiliation of a client 202 is defined by contact with a LOI. In one embodiment, client 202 will only receive both local media and local keys from a single LOI at a given time, because the Carrier to Interference (C/I) requirement for the physical layer is likely greater than 0 dB, at 1 Bit/Hz spectral efficiency. The presence of communication to a LOI defines that the client is affiliated to the LOI in current contact. In one embodiment, "having contact" is defined as the ability to decode media received from the LOI. In another embodiment, "having contact" is defined as having the ability to reliably detect the transmitter ID associated with the LOI.

The contact affiliation system provides a simple and implicit method for determining the approximate device location of client 202. The fact that communications exist means that functions that require communications with the LOI will work. Further, in this embodiment, assuming that the client is able to receive single feed network (SFN) national keys and associated media, the client will assume that it is allowed to view it, unless it is told otherwise. However, a potential hack may exist to circumvent blackout of programming on client 202 if local message traffic is suppressed. In one embodiment, this weakness can be ameliorated to some degree by removing the blacked-out national feed media in the blacked out LOI(s). Although this weakens the SFN coverage, it makes illicit reception of blacked out material less likely. In another embodiment, the keys may be removed and the content left.

In one embodiment, resolution of a black out area (i.e., service region) is set equal to the LOI coverage area. It is envisioned that the LOI coverage is nominally the same as a designated market area, but this may be only approximate. There is the possibility that near the edge of coverage that client 202 will pop back and forth between affiliations due to shadowing, unless there is an additional defined method that controls that phenomenon. In one embodiment, the greatest percentage of contact over the last X minutes with a particular LOI may define that LOI as the current affiliation for client 202. In another embodiment, where client 202 detects oscillating contact with multiple LOI's, it may maintain the affiliation based on the last contact.

Figure 3:
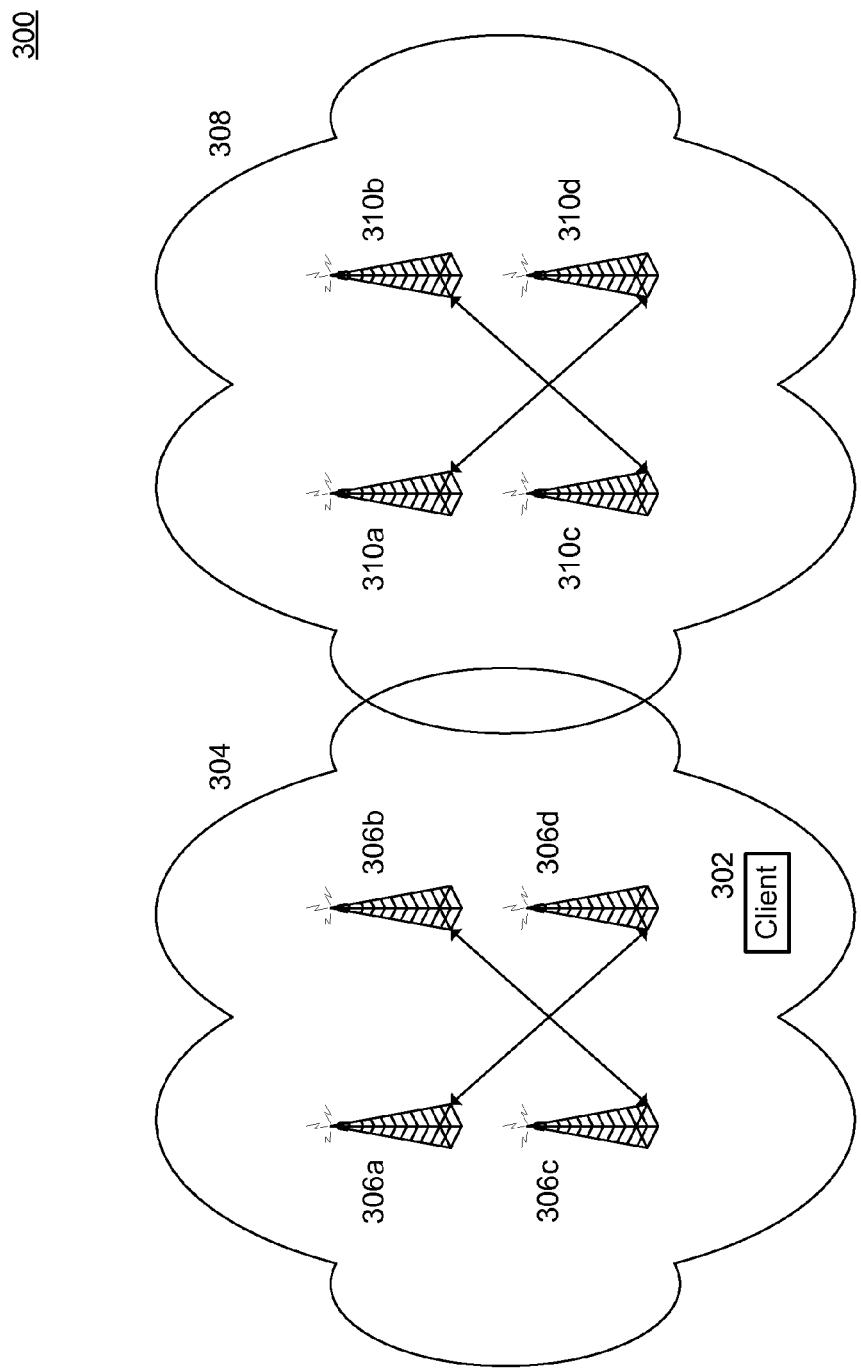

FIG. 3 illustrates a system 300, where affiliation of a client 302 is defined by a wireless network 304. A second wireless network 308 is also shown. In system 300, the approximate position of client 302 is determined by the pilots that it can see at any given time. Thus, in the example shown in FIG. 3, a specific set of Base Transceiver Systems (BTSs) 306a-d defines the service area shown by wireless network 304, while a second set of BTSs 310a-d define the service area shown by second wireless network 308. Thus, a database of BTSs that reside in a service area may be maintained and communicated to the clients within the service area's coverage. As discussed above, in another embodiment, the LOI may have associated transmitters that are different from BTSs and the identification (ID) of each of these transmitters is different to allow the client to determine the LOI with which it is currently affiliated independently of using the BTSs.

The wireless network affiliation system provides a relatively straightforward means to identify the client's current LOI affiliation. This location approach has finer resolution than the LOI contact system 200. In one embodiment, utilizing the level and relative strength of the pilots could refine the location estimates. The LOI and client 302 maintain an accurate list of the current valid BTS identifiers for the current LOI. Wireless network coverage maybe used to obtain media broadcast coverage. However, if blocking the communications with the wireless network will defeat a blackout, then, in one embodiment, a valid pilot has to be detected by client 302 in order to allow operation on any service that has an active black out.

In one embodiment, client 302 obtains a new list of valid BTS(s) when it does not see a valid BTS. Acquiring the list may cause network traffic and potentially delays the start of service. A channel that may have an active blackout has to be disabled during this process. It is likely that programs in the National feed will have to be flagged with an active blackout for this reason. In another embodiment, client 302 will store one or more lists of BTS(s) to that the "real time" acquisition of valid BTS(s) is not critical.

FIG. 4 is a flow diagram illustrating the operations as applied generally to the various embodiments of the systems described herein. In step 402, a plurality of service regions are defined. As described herein, the service regions may be defined by GPS coordinates, the ability of a client to contact a service region (LOI) and/or by the boundaries of a wireless network. In other embodiments, the service areas may be defined using other parameters. The affiliation of the client to a particular service area is determined in step 404, where the client determines if it belongs to the particular service area using one of the modalities described above. For example, if the service area is defined by a wireless network having one or more BTS(s), the client will determine if the BTS with which it is communicating is part of an affiliated LOI. Once the affiliation of the client has been determined, a service region specific message or event may be processed. In one embodiment, a blackout or a retune message may be processed. In another embodiment, a roaming message may be processed. Either the client or the LOI, as appropriate, may process the messages. For example, a client may determine it is outside of its home LOI and process a roaming message by sending a notification to the system to incur roaming charges. Conversely, the system may detect that a client is outside of its home LOI and process a roaming message by assigning roaming charges to the use of the client.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. A computer system in the LOT may also be suitably configured. In addition, hardware such as a GPS receiver may be incorporated as necessary in the client to implement the various embodiments of the present invention.

The embodiments described above are exemplary embodiments of the present invention. Those skilled in the art may now make numerous uses of, and departures from, the above-described embodiments without departing from the inventive concepts disclosed herein. Accordingly, the present invention is to be defined solely by the scope of the following claims.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A method for retune in a media broadcast system, the method comprising:
   periodically determining at least one affiliation of a wireless client with one of a plurality of broadcast related service regions, wherein the determining comprises:
      communicating with a transmitter from among a plurality of different transmitters to acquire a unique identification (ID) of the transmitter;
      determining if the transmitter is within an affiliated service region based on the unique ID of the transmitter, and
   receiving a message indicating a retune for devices affiliated with a specified service region, the message specifying substitute programming for blacked out programming based on the unique ID of the transmitter.

2. The method of claim 1, wherein the affiliation is determined based on a length of time over which the signal is received.

3. A non-transitory computer-readable medium having instructions encoded thereon, the encoded instructions, when executed by a processor, cause the processor to perform a retune method, the method comprising:
   periodically determining an affiliation of a wireless client with one of a plurality of broadcast related service regions, wherein the determining comprises:
      communicating with a transmitter from among a plurality of different transmitters to acquire a unique identification (ID) of the transmitter;
      determining if the transmitter is within an affiliated service region based on the unique ID of the transmitter; and
   receiving a message indicating a retune for devices affiliated with a specified service region, the message specifying substitute programming for blacked out programming based on the unique ID of the transmitter.

4. The non-transitory computer-readable medium of claim 3, wherein the affiliation is determined based on a length of time over which the signal is received.

5. An apparatus configured for retune in a wireless media broadcast system, the apparatus comprising:
   means for periodically determining an affiliation of a wireless client with one of a plurality of broadcast related service regions, wherein the determining comprises:
      means for communicating with a transmitter from among a plurality of different transmitters to acquire a unique identification (ID) of the transmitter;
      means for determining if the transmitter is within an affiliated service region based on the unique ID of the transmitter, and
   means for receiving a message indicating a retune for wireless clients affiliated with a specified service region, the message specifying substitute programming for blacked out programming based on the unique ID of the transmitter.

6. The apparatus of claim 5, further comprising means for determining the affiliation based on a length of time over which the signal is received.

7. A retuning apparatus in a wireless media broadcast system, the retuning apparatus-configured for:
   periodically determining an affiliation of a wireless client with one of a plurality of broadcast related service regions, wherein the determining comprises:
      communicating with a transmitter from among a plurality of different transmitters to acquire a unique identification (ID) of the transmitter;
      determining if the transmitter is within an affiliated service region based on the unique ID of the transmitter, and
   receiving a message indicating a retune for wireless clients affiliated with a specified service region, the message specifying substitute programming for blacked out programming based on the unique ID of the transmitter.

8. The retuning apparatus of claim 7, wherein the affiliation is determined based on a length of time over which the signal is received.

* * * * *